Feb. 21, 1933.  S. H. WILLISTON ET AL  1,898,473
WELL SURVEYING DEVICE
Filed Feb. 28, 1930    2 Sheets-Sheet 1

INVENTORS
Samuel H. Williston &
Charles R. Nichols
BY
Busser & Harding
ATTORNEYS

WITNESS:

Feb. 21, 1933.  S. H. WILLISTON ET AL  1,898,473
WELL SURVEYING DEVICE
Filed Feb. 28, 1930    2 Sheets-Sheet 2
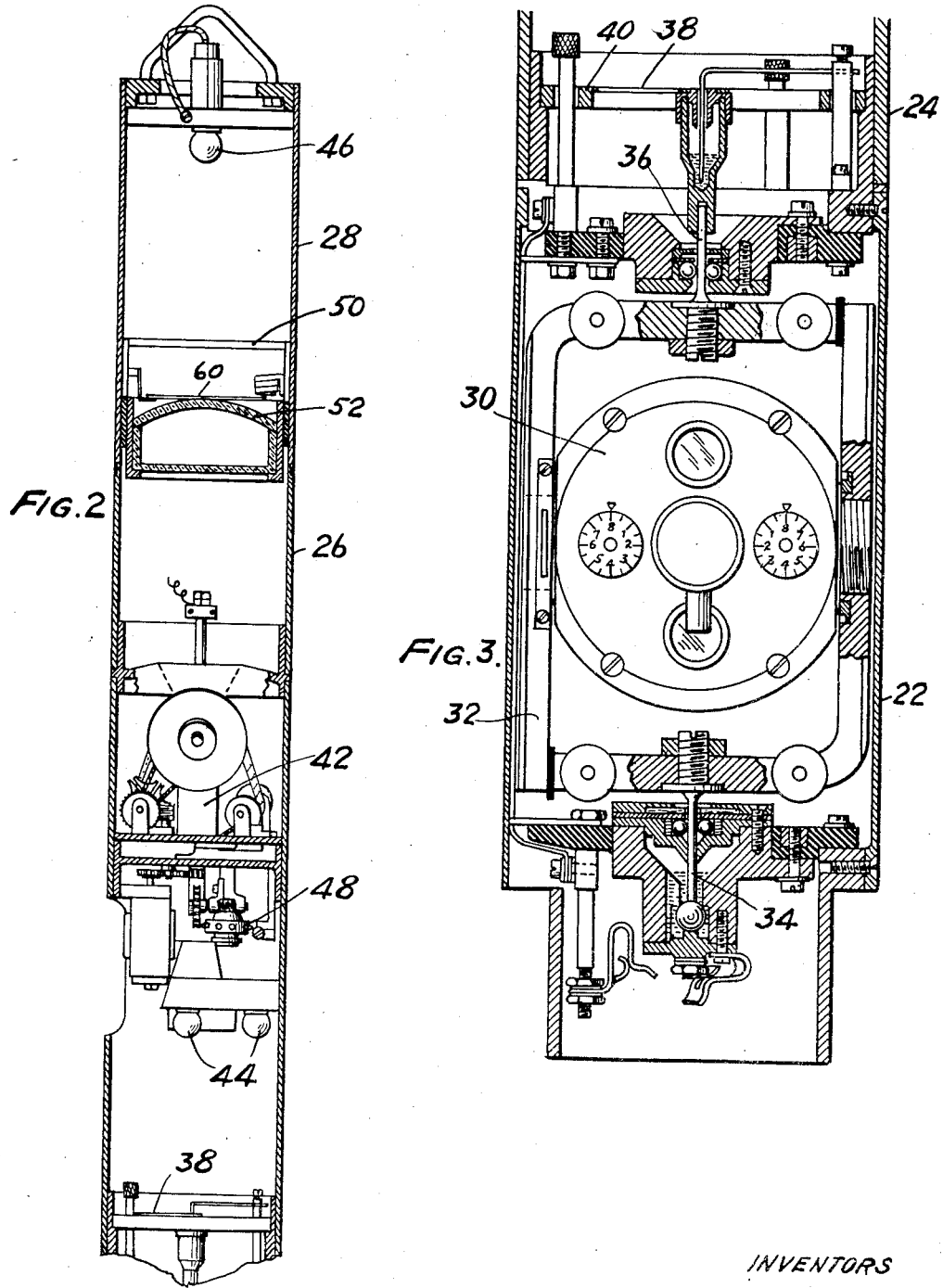
INVENTORS
Samuel H. Williston &
Charles R. Nichols
BY
Bussier Harding
ATTORNEYS.
WITNESS:

Patented Feb. 21, 1933

1,898,473

UNITED STATES PATENT OFFICE

SAMUEL H. WILLISTON AND CHARLES R. NICHOLS, OF DALLAS, TEXAS, ASSIGNORS TO SPERRY-SUN WELL SURVEYING COMPANY, OF PHILADELPHIA, PENNSYLVANIA, A CORPORATION OF DELAWARE

WELL SURVEYING DEVICE

Application filed February 28, 1930. Serial No. 432,030.

This invention relates to a well surveying device of the type adapted to be lowered into a bore hole and arranged to give a suitable record of the orientation of the hole at a given point.

In drilling oil wells or the like, it may happen, due to variations in the strata through which the drill passes, or to other causes, that the bore hole will deviate to a considerable extent from the vertical and assume very decided angles relative to the vertical direction. As a result of this deviation, serious errors may enter into the geological interpretations and recommendations concerning sub-surface structure, water shut-offs, valuations of property, etc., etc. In view of the resultant desirability of determining the location of any or all parts of a bore hole, various devices have heretofore been devised for determining with more or less accuracy the path of the bore hole through the soil.

The device of the present invention constitutes means for obtaining a substantially continuous record of the deviation of a bore hole throughout its length and includes means for automatically photographing simultaneously the position of a gyroscope, the position of a bubble or other level, and a pressure indicating means from which the deviation of a hole may be readily determined at various points along its length. The present device constitutes a modification of that disclosed and claimed in our prior application Serial Number 400,479, filed October 18, 1929, to which reference may be made for details of construction and in which various features of the present device are claimed.

The objects of the invention include the provision of means for obtaining great accuracy of results in a minimum of time and with a minimum of effort directed towards setting the device. Objects relating to the details of construction whereby these results are accomplished will be apparent from the following description read in conjunction with the accompanying drawings, in which:

Fig. 2 is a longitudinal section through the upper portion of the instrument case;

Fig. 3 is an enlarged axial section showing the gyroscope mounting;

Figure 1:
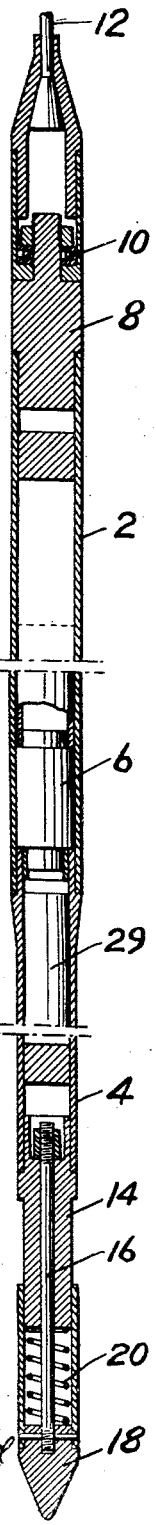
Fig. 1 is a longitudinal section through the casing arranged to enclose the recording instruments.

The instrument comprises an outer casing of heavy construction to withstand the high pressures existing at considerable depths in bore holes and includes two main portions 2 and 4 removably secured together for the adjustment and replacement of the recording instruments, which are enclosed in a casing 6. The upper end of portion 2 of the outer casing is provided with a head 8 which supports, through the medium of ball bearings, a swivel 10 arranged to be secured to a cable 12 by means of which the device may be lowered into the bore hole. To the lower end of portion 4 of the casing is secured a closure member 14 through which slides a rod 16 carrying a tapered nose 18 pressed outwardly by means of a spring 20 enclosed in a sleeve carried by the nose. By reason of the provision of this resiliently held nose, the device is enabled to slide readily over obstructions encountered during the passage through the bore hole, the impact being cushioned by means of the spring so as to effectively prevent disarrangement of the recording instruments. The upper end of portion 2 of the casing and the lower end of portion 4 are provided with suitable plugs welded therein to prevent the entrance of mud into the casing whereby damage to the instruments might occur.

The inner casing carrying recording instruments comprises several portions 22, 24, 26 and 28 of thin metal adapted to be secured together in any suitable fashion and having their joints arranged so that ready access may be had to the elements of the recording mechanism. The lower end of this casing is arranged to be supported upon the upper end of portion 4 of the outer casing, as illustrated in Fig. 1. The interior of portion 4 is adapted to carry suitable batteries 29 to supply power for the operation of the recording instruments.

In the lower end of the instrument casing there is contained a gyroscope 30 of a suitable type such as is more fully referred to in our prior application, the casing of which is pivoted about a horizontal axis in a two part gimbal ring 32 which is in turn pivoted about a vertical axis through the medium of spindles 34 and 36, power for the gyroscope being led in through the spindles and the two parts of the gimbal ring. The upper spindle carries a pointer 38 the end of which rotates adjacent the concentric dial 40 secured within the casing.

A camera 42 similar to that disclosed in our prior application and capable of photographing in both directions, is located above the gyroscope. This camera contains mechanism for intermittently moving a film past an aperture to produce exposures at various predetermined intervals which may vary from a few seconds to several minutes. While the instruments to be protographed may be continuously lighted and a shutter provided on the camera, it is found more suitable to provide lamps 44 and 46 for illuminating the instruments, these lamps being flashed intermittently at the time the film is stationary by contact making mechanism indicated at 48. A series of exposures are thus readily produced continuously as the casing is lowered in a bore hole. A master switch may be provided to set the driving motors for the camera and the gyroscope in operation just prior to the descent of the casing in the bore hole.

Figure 5:
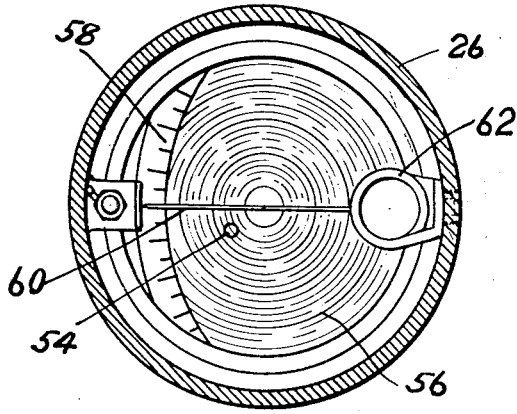
Fig. 5 is a transverse section on line 5—5 of Fig. 4.
Figure 4:
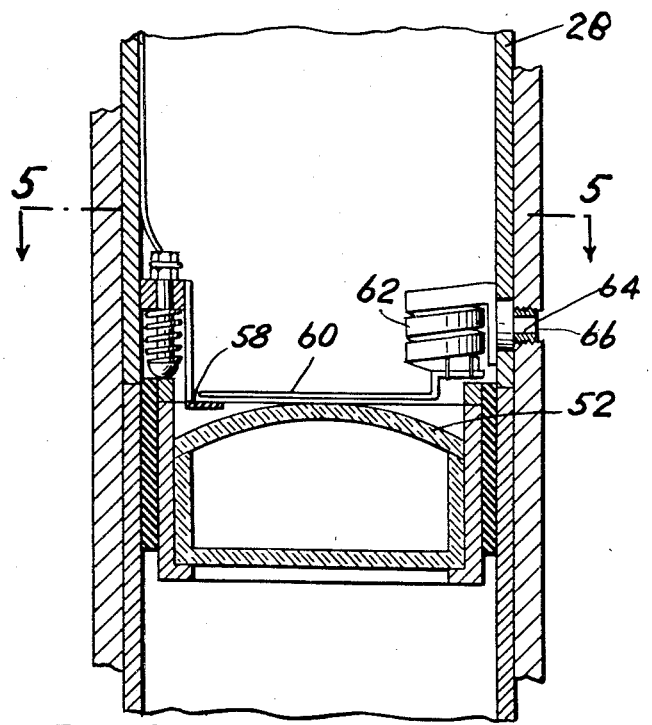
Fig. 4 is an enlargement of a portion of Fig. 2.

Below the upper lamp 46, which is located in the top of the casing, is an opal glass plate 50 adapted to diffuse the rays from the lamp to illuminate a transparent box level 52 which is provided with a semi-spherical top containing concentric markings indicated at 56 in Fig. 5. These markings may be so arranged that when one of them coincides with a pole 54 in the level the angular inclination of the bore hole at that point may be directly read. To provide for accuracy under various conditions of inclination of a bore hole, several box levels may be provided having different ranges of indications. In order to secure sharp images, the box levels are preferably substantially concentric with the optical center of the upper lens system of the camera.

Located directly above the box level is an arcuate transparent scale 58 cooperating with a pointer 60 carried by the movable member 62 of a pressure gauge which may be of a Bourdon or aneroid, or other type. This gauge communicates through the walls of the inner and outer casings, as indicated at 64, with the interior of the bore hole so as to directly indicate the pressure therein, a flexible diaphragm 66 of rubber being provided over the exit to prevent the entrance of mud or sand into the gauge. The gauge itself is filled with oil. It will be noted that the scale 58 is fastened to the upper inside casing and rotates with the gauge when the outer casing is being secured tight. The pressure gauge needle is of very thin construction so as not to obscure the dial in the box level.

Whereas in the construction shown in our prior application it is necessary to photograph together with the inclination and direction indications a timepiece within the casing which is synchronized with the timepiece on the surface in order to calculate the depths at which the various readings are taken, in the present device it is unnecessary to perform any control or take any readings whatever at the surface, since, when the bore hole is full of water, the pressure gauge will give an accurate indication of the depth at which the various readings are taken, the needle being photographed simultaneously with the readings of the level and the gyroscope. The scale 58 may either record the pressure or it may be calibrated directly in terms of depth so that no calculations are necessary in order to obtain complete data relative to the bore hole. The necessity of taking complete readings without surface control is due to the fact that control or transmission of power from the surface is impractical by reason of the impossibility of providing insulated cables which will stand up under frictional wear incident to their pasage down the bore hole. The present device, as stated above, even eliminates the necessity for making any readings of depth and time at the surface.

What we claim and desire to protect by Letters Patent is:

1. A well surveying device comprising a casing adapted to enter a bore hole, and recording mechanism within the casing, said mechanism including means for indicating the inclination of a bore hole, means for indicating the pressure in the bore hole, and means for recording the indications of the inclination and pressure indicating means.

2. A well surveying device comprising a casing adapted to enter a bore hole, and recording mechanism within the casing, said mechanism including means for indicating the inclination of a bore hole, means for indicating the pressure in the bore hole, and means for photographically recording the indications of the inclination and pressure indicating means.

3. A well surveying device comprising a casing adapted to enter a bore hole, and recording mechanism within the casing, said mechanism including means for indicating the inclination of a bore hole and the direction of such inclination, means for indicating the pressure in the bore hole, and means for recording the indications of the inclination, direction and pressure indicating means.

4. A well surveying device comprising a casing adapted to enter a bore hole, and recording mechanism within the casing, said mechanism including means for indicating the inclination of a bore hole and the direction of such inclination, means for indicating the pressure in the bore hole, and means for photographically recording the indications of the inclination, direction, and pressure indicating means.

5. A well surveying device comprising a casing adapted to enter a bore hole, and recording mechanism within the casing, said mechanism including means for indicating the inclination of a bore hole, means for indicating the pressure in the bore hole, and means for recording the indications of the inclination and pressure indicating means, said recording mechanism being independent of surface control.

6. A well surveying device comprising a casing adapted to enter a bore hole, and recording mechanism within the casing, said mechanism including means for indicating the inclination of a bore hole, means for indicating the pressure in the bore hole, and means for photographically recording the indications of the inclination and pressure indicating means, said recording mechanism being independent of surface control.

7. A well surveying device comprising a casing adapted to enter a bore hole, and recording mechanism within the casing, said mechanism including means for indicating the inclination of a bore hole and the direction of such inclination, means for indicating the pressure in the bore hole, a camera having an opening, automatic means within the casing for feeding a film intermittently across the opening, means for simultaneously projecting an image of the direction, inclination and pressure indicating means upon the film, and means within the casing for automatically and intermittently illuminating the instruments for the production of successive exposures of the instruments.

8. A well surveying device comprising a casing adapted to enter a bore hole, and recording mechanism within the casing, said mechanism including means for indicating the inclination of a bore hole, means for indicating the pressure in the bore hole, a camera having an opening, automatic means within the casing for feeding a film intermittently across the opening, means for simultaneously projecting an image of the inclination and pressure indicating means upon the film, and means within the casing for automatically and intermittently illuminating the instruments for the production of successive exposures of the instruments.

In testimony of which invention, we have hereunto set our hands, at Dallas, Texas, on this fifteenth day of February, 1930.

SAMUEL H. WILLISTON.
CHARLES R. NICHOLS.